Dec. 16, 1930.  J. RAH  1,784,881
INSULATING JOINT
Filed May 31, 1927
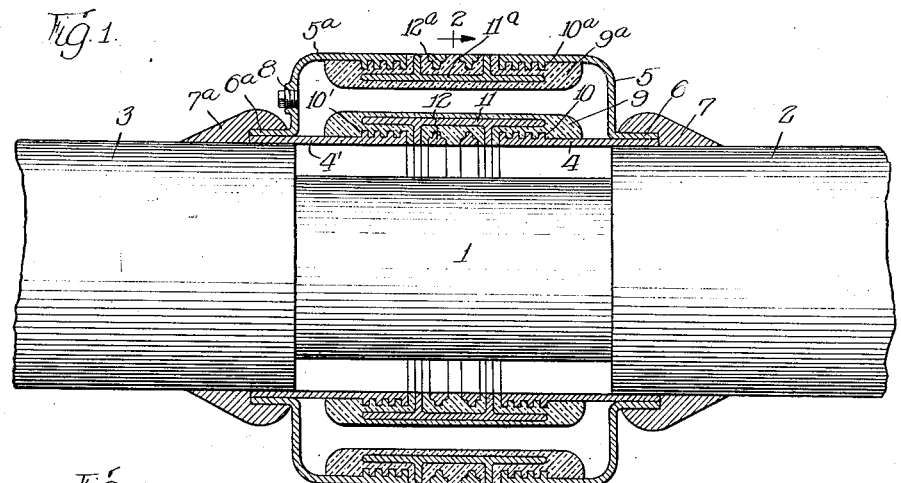

Patented Dec. 16, 1930

1,784,881

UNITED STATES PATENT OFFICE

JOSEPH RAH, OF CHICAGO, ILLINOIS, ASSIGNOR TO G AND W ELECTRIC SPECIALTY COMPANY, OF CHICAGO, ILLINOIS, A CORPORATION OF ILLINOIS

INSULATING JOINT

Application filed May 31, 1927. Serial No. 195,359.

The invention pertains to insulating joints, and particularly to a novel insulating sleeve adapted to form an uninterrupted connection between spaced ends of lead sheathing disposed around a current carrying cable.

An object is to provide a continuation of the sheathing effect of a lead encased cable.

Another object is to form an insulating connection between broken or spaced ends of cable sheathing.

Still another object is to provide a means for interrupting the current flow in the cable sheathing but at the same time compensate for the concentration of forces due to this interruption.

A further object is to provide a means for dividing the lines of force set up at the edges of a cable sheathing into a plurality of smaller and separated stresses.

A still further object is to provide a means which will permit of the interruption in the lead sheathing so that there will be no loss of power due to unnecessary air heating in the cable.

Other and more specific objects will readily occur from the detailed specification, claims and drawings appended hereto.

In the drawings, wherein like reference characters designate like parts—

Figure 1 is a partial sectional view through an insulating sleeve of the double wall type provided for bridging a gap or interruption in the lead sheathing of a current carrying cable;

Figure 2 is a cross section of Figure 1 taken on the plane represented by the line 2—2 of Figure 1;

Figure 3 is a longitudinal sectional view of an insulating sleeve of the single wall type provided for the purpose of connecting the lead sheathing of a cable;

Figure 4 is a stress diagram showing the lines of force set up at the annular edge of the lead sheathing when said sheathing is interrupted; and Figure 5 is a view similar to Figure 4, showing the change of lines of force and their concentration when metal members are interposed in the direction of the length of the cable and between the annular edges of the cable sheath.

Referring particularly to Figures 1 and 2, a cable 1 is provided having interrupted lead sheathing 2 and 3. Bridging said sheathing, there is provided an inner sleeve, preferably of brass, comprising a member 4 contacting the sheathing 2, a similar member 4' contacting the sheathing 3, and connecting said members there is provided an insulating sleeve 9 preferably of a phenol condensation product, which is provided with metal rings 12 and a reinforcing ring 11 so disposed in the sleeve as to overlap the members 4, 4' and 12, and having a portion extended to the inner circumference of the sleeve 9 so as in effect to form a condenser. Surrounding and spaced from this inner sleeve is an outer sleeve 5 flanged at 6 to contact a portion of the inner sleeve 4. This flange and the contacting portion of the inner sleeve, it will be understood, is fixed with respect to the sheathing by means of the wipe 7. The member 4 and 5 are provided with upstanding lugs or threads 10 and 10$^a$ respectively, and a sleeve 9$^a$ similar to the sleeve 9 has similar metal members 12$^a$ and 11$^a$ provided for connecting the parts 5 and 5$^a$ of the upper sleeve, it being understood that the sleeve 5$^a$ is provided with a flange 6$^a$ which is adapted to be wiped to the sheath 3 by means of the wipe 7$^a$. A plug 8 is provided in the outer sleeve for the introduction of the usual insulating compound into said sleeve. It is to be understood that an insulating compound may be provided around the cable 1 filling the space between said cable and the inner sleeve.

Referring particularly to Figure 3, it will be seen that surrounding the cable 20 and connecting the interrupted sheathing 21 and 22, there is provided connected brass sleeves 23 secured to the sheathing by means of the wipes 24. These sleeves 23 are provided with lugs or threads 25 for cooperation with a sleeve 26 of phenol condensation product extended between the sleeves 23 and provided with metal members 28 set in said sleeve and also provided with a member 27 having overlapping relation with the members 23 and 28, thereby having a condenser effect.

One of the obvious advantages secured through the use of the embodiment of the invention as disclosed in Figure 1 is that the plurality of metallic sleeves employed allows for a cable of higher capacity to be used with the same size of interruption or gap in the sheathing. It is seen that the lead sheathing tends to develop electromotive force per unit length, which depends primarily upon the current carried in the conductor. As a consequence the stresses upon the insulation are higher as the carrying capacity of the cable increases. The use of a plurality of separated metallic sleeves provides for an increase in the number of metal rings employed. Since several insulating rings are used, each carrying a set of the metal rings, the increased stresses due to the higher current load are therefore more evenly distributed and a greatly reduced stressing of the insulation is secured as a result.

In practice, it has been found that if too long a lead sheathing is used around a current carrying cable that the lead sheathing is heated, causing the air contained around the cable to be heated with a consequent loss of power in the cable caused by said heat which cannot be utilized. In order to obviate this objection, the cable sheathing has been interrupted, as already described, and metal sleeves have been fastened to the different portions of the sheathing so as to maintain the continuity of the installation, but these sleeves have been insulated from each other by some means, as described, said means carrying a plurality of metal rings.

Referring to Figure 4, wherein only the cable sheathing is represented as interrupted, it has been found that stresses due to the lines of force 50 are concentrated at points A and B, said lines of force extending angularly from the point C midway between the termination of the sheathing, the angle of the lines of force increasing to a line normal to the cable, as represented at A D, B D. By putting in surrounding rings $d$, these forces 50 are divided in effect on the insulation and sheathing so that smaller forces 51 are concentrated at a plurality of points, as shown at $a$ and $b$ on the sheathing, and $c$ on the rings $d$, and it will be noted that for a similar gap, the summation of the forces at $a$, $b$, $c$ (4 points as shown), is equal to the summation of the forces at A and B. It will then be seen that due to this multiple interruption of the concentration of the lines of force (at $a$, $b$ and $c$) there is consequently a greatly reduced stressing of the insulation.

It is to be understood that I do not wish to be limited by either the materials designated as employed or by the exact embodiment shown as other and obvious embodiments will occur to those skilled in the art.

I claim:

1. In a device of the character described, the combination of a sheathed cable having an interruption in the sheathing, and an insulation containing means for bridging said interruption, said means comprising a plurality of metallic members positioned in and spaced by a plurality of condensers.

2. In a device of the character described, the combination with a sheathed cable having a gap in said sheathing, a sleeve for bridging said gap, said sleeve comprising spaced metallic members associated with said sheathing, insulation disposed between and joining the edges of said members, and a plurality of metallic members disposed between and insulated from the edges of said first mentioned members.

3. In a device of the character described, the combination of a sheathed cable having a gap in the sheath, a sleeve for bridging said gap, said sleeve comprising spaced metallic members associated with said sheathing, and an insulating ring joining the ends of the metallic members, said insulating ring carrying a plurality of metal rings disposed between and insulated from the edges of said metallic members.

Signed at Chicago, Illinois, this 24 day of May, 1927.

JOSEPH RAH.